MEASURING CIRCUIT

Filed Oct. 13, 1967

INVENTOR:
Wilhelm Nobis

By Jerome B Rockwood
AGENT

United States Patent Office 3,463,934
Patented Aug. 26, 1969

3,463,934
MEASURING CIRCUIT

Wilhelm Nobis, Merzhausen im Breisgau, Germany, assignor to Fritz Hellige & Co. G.m.b.H., Freiburg im Breisgau, Germany Filed Oct. 13, 1967, Ser. No. 675,185
Claims priority, application Germany, Oct. 14, 1966, H 60,761
Int. Cl. H02j 3/28
U.S. Cl. 307—149 4 Claims

ABSTRACT OF THE DISCLOSURE

A measuring circuit is described which is suitable for use with a variety of alternating current operated transducers. A terminating device serves to supply operating carrier voltages to the transducers and connect the modulated voltage to an amplifying and indicating or recording circuits. Complex unbalances of the transducer and cable are automatically corrected by a self-adjusting auxiliary bridge circuit.

The present invention relates to measuring circuits and more particularly to measuring circuits connected to transducers which operate upon a carrier frequency in accordance with a physical phenomenon.

Alternating voltage amplifiers are being increasingly employed in electrical measuring applications to amplify the transducer signal for use by the indicating or recording device. As compared with the previously employed direct voltage amplifiers, alternating voltage amplifiers exhibit substantially better stability. Alternating voltage amplifiers may be used where direct current amplifiers cannot be employed, as in the case of inductive or capacitive transducers, or differential transformers. Such transducers are frequently employed, since they are stable and rugged.

Certain disadvantages result from the employment of alternating current devices, however. Transducers and connecting cables vary in their resistive and reactive characteristics. Cable characteristics vary as the length varies in accordance with the distance between the measuring equipment and the point where the measurement is to be taken. These complex unbalances, therefore, must be compensated individually for each combination of transducer and connecting cable prior to taking any meaningful measurements.

Complex unbalance requires two adjustments, one balancing out the real or resistive unbalance component and the other the imaginary or reactive component.

Heretofore, such complex unbalances required manual balancing by the operator. The operator must first balance the resistive component, then the reactive component, which in turn again unbalances the resistive component. Thus, several steps were normally required in prior art devices. As will be apparent, if several quantities are to be measured by means of several transducers, a long and tiresome balancing procedure must be followed prior to measurements being taken. Further, rapid changes of temperature or other environment characteristics may change the zero points of the transducer and cable, requiring rebalancing during the measurement process. Obviously this cannot be conveniently done manually.

It is, therefore, an object of the present invention to provide an alternating current measuring circuit suitable for use with a variety of transducers.

Another object of this invention is to provide an alternating current measuring circuit wherein resistive and reactive error voltages may be automatically reduced to zero.

Another object of the present invention is to automatically apply real and imaginary correcting voltages to compensate for connecting cable and transducer unbalances.

Another object of this invention is to automatically provide correcting voltages for transducer and connecting cable compensation by means of an unbalanced AC bridge.

Another object of this invention is to provide an AC measuring circuit which is simple and economical to construct, accurate, and simple and speedy in operation.

These and other objects and advantages of the present invention will become apparent from the following specification and appended drawing, wherein.

Figures 1, 2A, 2B, 2C:
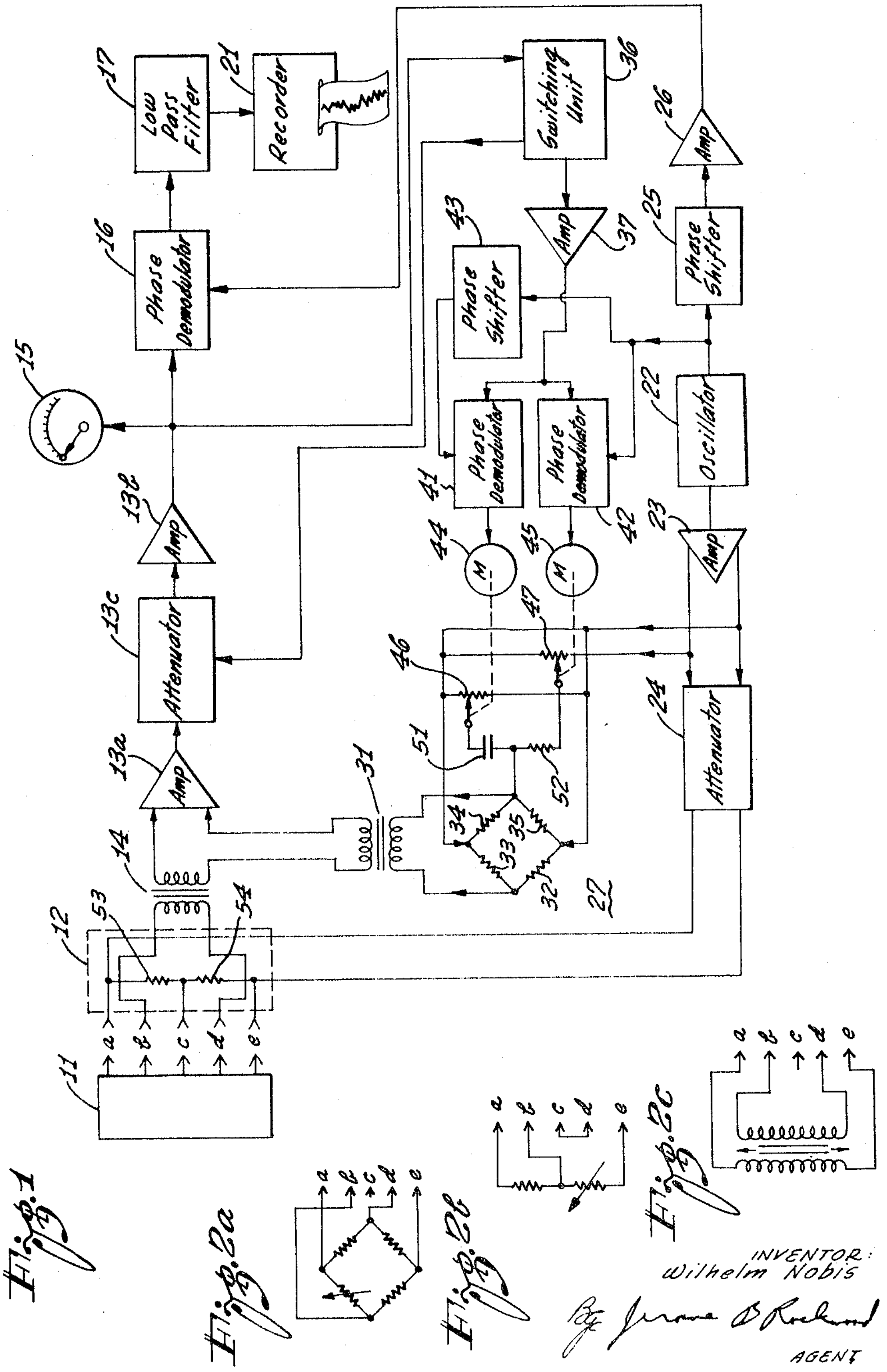
FIGURE 1 is a schematic block diagram of the present invention.
FIGURES 2A, 2B and 2C illustrate some of the transducers which may be employed in connection with the present invention.

Referring now to the drawings and particularly to FIGURE 1 thereof, measuring apparatus in accordance with the present invention include transducer 11 connected to transducer terminating device 12. The alternating current output signal from the transducer is applied to amplifier 13 through transformer 14. Amplifier 13 is illustrated with two amplifying stages, **13*a* and 13*b*, and an interstage attenuator 13*c*. A balance indicator 15 may be conveniently connected to the output of amplifier stage 13*b*. The amplified AC output signal from amplifier stage 13*b* is then applied to ring demodulator 16. The modulation signal recovered by ring demodulator 16 is filtered in low pass filter 17 and the resulting voltage, representing the variable measure by the transducer, is conveniently displayed or recorded as on a strip chart recorder or other suitable device 21**.

A master oscillator 22 supplies the AC actuating signal to the transducer 11 through terminating device 12, buffer amplifier 23 and a suitable attenuator 24. In addition, master oscillator 22 supplies the required reference signal to ring demodulator 16 through a phase shifter 25 and a buffer amplifier 26. Automatic zero balancing of the transducer and connecting cable is provided by a bridge 27 connected to transformer 14 and input amplifier stage **13*a* through a transformer 31. Bridge 27 comprises four resistive legs 32, 33, 34 and 35. The primary winding of transformer 31 is connected to the junctions of resistors 32 and 33, and of resistors 4 and 5. The required resistive and reactive voltages are applied to the bridge between the junctions of resistors 33 and 34, and 32 and 35**.

Switching means 36 is connected to reduce attenuation in attenuator **13*c* to provide maximum gain for amplifier 13. Simultaneously, the output signal from amplifier stage 13*b* is applied to power amplifier 37, and thence to ring demodulators 41 and 42. A voltage from reference oscillator 22 is also applied directly to ring demodulator 42, and through phase shifter 43, to ring demodulator 41. The output signals from ring demodulators 41 and 42 are applied to servo motors 44 and 45 respectively. Servo motor 44 drives the wiper on potentiometer 46 and servo motor 45 drives the wiper on potentiometer 47. Both potentiometers are connected to the output of master oscillator 22 through buffer amplifier 23. The wiper of potentiometer 46 is connected to the junction of resistive arms 34 and 35 of bridge 27 through a capacitor 51 while the wiper arm of potentiometer 47 is connected to the same point on the bridge through resistor 52**.

Transducer 11 and its mating terminating device 12 are each provided with five connection points, labeled on the drawing as *a*, *b*, *c*, *d* and *e*. Connection points *a* and *e* are energized by master oscillator 23 through attenuator 24. Resistors 53 and 54 are connected in series between connection points *a* and *e*. Connection points *b* and *d* are connected to the primary winding of transformer 14 while connection point *c* is connected to the junction between resistors 53 and 54. The Wheatstone bridge type of transducer illustrated in FIGURE 2A has one set of opposing junctions connected to connection points *a* and *e*, thereby resulting in a signal from the master oscillator being applied to the bridge. The other two junction points of the bridge transducer are connected to connection points *b* and *d*, which are connected in turn to the primary winding of transformer 14. Thus as the variable element in the bridge, connected between points *a* and *b*, varies in accordance with the elements being measured, the bridge will be unbalanced and the alternating voltage between points *b* and *d* will vary with the unbalance.

FIGURE 2B illustrates a transducer wherein half the bridge circuit is at the measuring point and the other half is in terminating element 12. Thus points *a* and *e* in FIGURE 2B are connected to resistors 53 and 54 and also to master oscillator 22. The junction of the two resistors in the transducer of FIGURE 2B is connected to connection point *b*, and to one end of the primary winding of transformer 14. Connection points *c* and *d* are shorted together, thereby connecting the junction point of resistors 53 and 54 to the other side of the primary winding of transformer 14.

In the differential transformer transducer illustrated in FIGURE 2C, both ends of one winding are connected to master oscillator 22 through connection points *a* and *e*, while the ends of the other winding are connected to the primary winding of transformer 14 through connection points *b* and *d*. The phase of the voltage induced in the secondary winding of the differential transformer varies in accordance with the position of the movable core, as is well known to those skilled in the art.

The output signal from the transducer is in the form of a modulated carrier frequency current. This modulated signal is applied to AC amplifier input stage **13*a* by means of impedance matching transformer 14. Amplifier 13 is preferably an alternating current amplifier with high negative feedback for stability. Gain is varied for reasons, to be further discussed hereinbelow, by attenuator 13*c*. The amplified output signal is demodulated by ring demodulator 16. At the output of demodulator 16, a voltage proportional to the quantity to be measured is provided to recording device 16 through low pass filter 17. Master oscillator 22 provides the reference phase to ring demodulator 16 through phase shifter 25 and amplifier 26. Phase shifter 25 is provided to enable compensation for phase shift in transformers 14 and 31 and in amplifier 13**.

System balance is accomplished prior to the beginning of measurement. Switch 36 is actuated, connecting the output of signal amplifier 13 to power amplifier 37. The output of power amplifier 37 is applied to ring demodulators 41 and 42. Ring demodulator 42 is also connected to oscillator 22 so that it will provide an output null at zero phase shift. Phase shifter 43 connected to oscillator 22, shifts the phase of the signal from oscillator 22 ninety degrees. The ninety degree phase shifted signal is compared with the transducer signal furnished by power amplifier 37, providing a zero output balance when the two signals are in phase quadrature. Thus, at the output of demodulator 42, a voltage proportional to the real component of the measuring signal from the output of amplifier **13*b* is supplied and at the output of the ninety degree demodulator 41** a voltage is supplied proportional to the imaginary component.

Servo motors 44 and 45 vary the taps on potentiometers 46 and 47. Potentiometer 46 and resistor 51 supply a variable quadrature voltage to bridge 27, and potentiometer 47 and resistor 52 supply a zero phase voltage component to bridge 27. In combination, these two circuits result in application of a complex voltage to bridge 27. This complex voltage is applied in series with the voltage signal from transducer 11 by means of the serially connected secondary windings of transformers 14 and 31. The complex unbalance of the bridge 27 is changed by servo motors 44 and 45, operating potentiometers 46 and 47 respectively so that the difference between the complex unbalance voltage of the transducer and the complex compensating voltage furnished by bridge 27 is reduced to zero.

It is desirable that the bridge 27 be supplied with a constant voltage. This voltage should be independent from the transducer energizing voltage, adjusted by attenuator 24. The desired transducer energizing voltage is adjusted to a value compatible to the measuring quantity to be determined. If this voltage were applied to the bridge, the sensitivity of the controlling circuit for the unbalance components would be changed in an undesirable manner. To prevent this, a coupling is provided between switch 36 and attenuator **13*c* so that upon actuating the controlling device during the balancing procedure, the attenuator 13*c* is switched to provide maximum amplification by amplifier 13**.

Compensating bridge 27, however, is supplied with a constant fixed voltage by the master oscillator 22 and is independent of the value of the supply voltage to transducer 11. Thus, the amplification of the controlling circuit is constant, resulting in a constant zero. Standard transducers may be employed since the transducer is not balanced to zero by adjusting the transducer itself. Instead, the complex voltage delivered by the transducer, which is caused by its unbalance, is compensated to zero by supplying to it the compensating voltage from compensating bridge 27.

The circuit in accordance with the present invention allows a broad balancing range and does not require matching to the kind of transducer being employed, enabling broad use and ease in the measuring procedure. The balancing range may be increased further in accordance with the proportion of the supply voltages for bridge 27 and transducer 11. In addition the input impedance of the circuit will not be changed in response to balancing of bridge 27. The circuit may also be employed to suppress the zero and amplify the desired range of the variable to be measured. Suppression of the zero in this manner enables small dynamic changes of the variable under observation to be measured. If two measuring amplifiers in accordance with the present invention are connected in parallel to a single transducer, the entire quantity of the variable may be measured, including both the static and dynamic portions, or the dynamic portion may be separated from the combination and determined separately.

Although a representative embodiment of this invention has been disclosed hereinabove, it will be apparent to one skilled in the art that many modifications and variations of the disclosed apparatus are contemplated. Therefore, this invention is to be given its broadest possible interpretation within the terms of the following claims.

I claim:

1. A measuring circuit suitable for use with a variety of transducer configurations, comprising:

a master oscillator;

terminating means for connecting said master oscillator to a transducer configuration;

indicating means coupled to said transducer configuration;

compensating means for providing a correcting balance voltage, said compensating means including:

voltage means for providing respective real and imaginary voltage components;

first combining means for combining said respective real and imaginary voltage components;

an auxiliary bridge;

first connecting means for connecting said respective real voltage components across a first arm of said auxiliary bridge;

second connecting means for connecting said respective imaginary voltage components across a second arm of said auxiliary bridge; and bridge output means for coupling the output of said bridge to the output of said transducer configuration; and second combining means for combining respective signals from said transducer configuration and respective signals from said compensating means.

2. A measuring circuit as recited in claim 1, wherein said terminating means comprises:

impedance means having a center tap;

means for connecting said master oscillator to said impedance means and to said transducer configuration; and means enabling connection of said center tap to said transducer configuration.

3. A measuring circuit as recited in claim 1, wherein a variable gain amplifier is connected between said terminating means and said indicator, and further wherein attenuating means is connected to the output of said variable gain amplifier for varying the gain of said amplifier to accommodate the level of measured variable, and switching means is connected to said attenuating means for increasing the gain of said amplifier when operating said compensating means.

4. A measuring circuit as recited in claim 1, wherein said compensating means further includes:

first and second demodulators;

means connecting said first and second demodulators to a signal from said transducer configuration;

means connecting said first demodulator to said master oscillator;

a ninety degree phase shifter;

means connecting said phase shifter between said master oscillator and said second demodulator;

a first potentiometer connected to said auxiliary bridge through a resistor;

a second potentiometer connected to said auxiliary bridge through a capacitor;

a first servo motor connected to said first demodulator and varying said first potentiometer; and a second servo motor connected to said second demodulator and varying said second potentiometer.

References Cited

UNITED STATES PATENTS

| | | |
|---|---|---|
| 2,546,025 | 3/1951 | Breimer. |
| 2,715,717 | 8/1955 | Keithley et al. |
| 3,100,546 | 8/1963 | Cramwinckel. |
| 3,287,978 | 11/1966 | Knudson. |
| 3,310,974 | 3/1967 | Banks. |

ROBERT K. SCHAEFER, Primary Examiner

T. B. JOIKE, Assistant Examiner

U.S. Cl. X.R.

73—1; 324—57; 333—17